United States Patent Office 3,715,386
Patented Feb. 6, 1973

3,715,386
AMINIUM AND DIIMONIUM SALTS USED AS POLYMERIZATION INHIBITORS OF ACRYLATES AND CARBONATES
Allan Ellis Sherr, Warren, N.J., assignor to American Cyanamid Company, Stamford, Conn.
No Drawing. Filed May 15, 1970, Ser. No. 37,867
Int. Cl. C07c 69/54
U.S. Cl. 260—486 R                              8 Claims

ABSTRACT OF THE DISCLOSURE

A method of inhibiting the polymerization of methacrylate monomers and diallyl diglycol carbonate by the addition thereto of various aminium and diimonium salts and the products produced thereby are disclosed.

BACKGROUND OF THE INVENTION

Monomeric methacrylates and diallyl diglycol carbonates are normally liquid at room temperature i.e. about 10° C. to about 30° C., and tend to polymerize in a relatively short time on standing at said temperature. As a result, it is relatively impossible to store such monomers for extended periods of time without somehow preventing the polymerization such as by maintaining a cold environment, adding extraneous materials etc.

Since one of the desirable features of these monomers is that they are liquid and thereby are conveniently handled, mixed, processed etc., it is impractical to maintain minor quantities on hand for subsequent usage without inhibiting the polymerization thereof.

The prior methods for preventing the polymerization of these liquid monomers all suffer at least some disadvantages. For example, additives are the most troublesome because of the fact that they (1) continue to remain admixed with the monomer throughout subsequent use thereof, sometimes even imparting undesired properties to subsequent polymerization products, or (2) must be removed, necessitating expensive recovery techniques.

SUMMARY

I have now discovered that the polymerization of methacrylate monomers and diallyl diglycol carbonate, monomers which normally polymerize on standing at about room temperature, is inhibited by the presence of certain organic aminium and diimonium compounds. The presence of the aminium and diimonium compounds does not distract from the favorable properties of polymers produced from the monomers and therefore they need not be removed or otherwise controlled.

DESCRIPTION OF THE INVENTION INCLUDING PREFERRED EMBODIMENTS

As mentioned above, small amounts of various aminium and diimonium salts prevent the polymerization of methacrylate monomers and diallyl diglycol carbonate upon standing when added thereto. That is to say, amounts as small as one tenth of one part per million of the salts have been found to be effective in the prevention of the autopolymerization of methacrylate monomers and diallyl diglycol carbonate per se or in solution.

The polymerization inhibitors are members of the following three classes of compounds:

(A) Tris(p-dialkylaminophenyl)aminium salts of the formula:

(I) 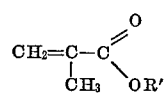

(B) Bis(p-dialkylaminophenyl)[N,N - bis(p - dialkylaminophenyl)-p-aminophenyl]aminium salts of the formula:

(II) 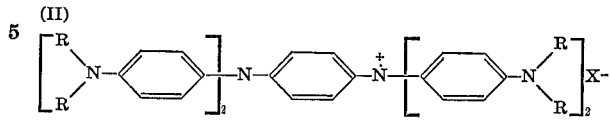

(C) N,N,N',N'-tetrakis(p-dialkylaminophenyl)-p-benzoquinonediimonium salts of the formula:

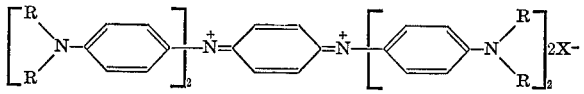

wherein each R is a lower alkyl group of from 1-5 carbon atoms, inclusive, and X is an anion. Methods for the preparation of compounds represented by Formulae I, II and III, as well as the compounds per se, are set forth in at least one of U.S. Pats. Nos. 3,251,881; 3,341,464 and 3,484,467 which patents are hereby incorporated herein by reference.

The anion portion of the above compounds is not critical and such anions as the perchlorate ($ClO_4^-$), fluoroborate ($BF_4^-$), trichloroacetate ($CCl_3COO^-$), trifluoroacetate ($CF_3COO^-$), picrate [$(NO_2)_3C_6H_2O^-$], hexafluoroarsenate ($AsF_6^-$), hexafluoroantimonate ($SbF_6^-$), benzenesulfonate ($C_6H_5SO_3^-$), ethanesulfonate $$(C_2H_5SO_3^-)$$

phosphate ($PO_4^{---}$), sulfate ($SO_4^{---}$), nitrate ($NO_3^-$), chloride ($Cl^-$) and the like may be used.

Representative salts of Formulae I, II and III, above, include tris(p-dimethylaminophenyl)aminium hexafluoroantimonate,
tris(p-diethylaminophenyl)aminium hexafluoroantimonate,
tris(p-dibutylaminophenyl)aminium hexafluoroantimonate, and the corresponding hexafluoroarsenates;

bis(p-diethylaminophenyl)[N,N-bis-(p-diethylaminophenyl)-p-aminophenyl]aminium hexafluoroantimonate,
bis(p-dibutylaminophenyl)[N,N-bis(p-dibutylaminophenyl)-p-aminophenyl]aminium hexafluoroantimonate, and the corresponding hexafluoroarsenates;

N,N,N',N'-tetrakis(p-diethylaminophenyl)-p-benzoquinonebis(imonium hexafluoroantimonate),
N,N,N',N'-tetrakis(p-dibutylaminophenyl)-p-benzoquinonebis(imonium hexafluoroantimonate), and the corresponding hexafluoroarsenates and the like.

As indicated above, the methacrylate monomer and diallyl diglycol carbonate are normally liquid monomers. The autopolymerization thereof can be prevented, according to the instant invention, whether the monomers are being treated per se, as solutions in solvents therefor or in admixture with other monomers with which they are to be subsequently polymerized. For example, monomers having the formula V 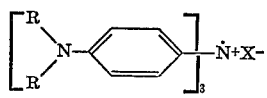

wherein R' is an alkyl group of 1–18 carbon atoms, inclusive, i.e. methyl, ethyl, t-butyl, t-amyl, cyclohexyl, octyl, lauryl, stearyl methacrylate etc. may be inhibited from autopolymerization alone, in admixture with one another, as solutions in solvents therefor, or in admixture with other monomers with which said methacrylates are copolymerizable. Examples of such comonomers include alkyl acrylates, styrenes, acrylonitriles, vinyl acetate, vinyl halides, vinylidene halides and the like.

As little as one tenth of one part of the salts of Formulae I, II and III, alone or in admixture with one another, to one million parts of monomer may be utilized according to the present invention, with ranges of from about 0.1 to about 1000 parts of salt per million of monomer, preferably from about 1 to 100 parts of salt per million of monomer, being exemplary.

The method of addition of the salt to the monomer is not critical and any known technique may be employed. Uniform dispersing of the salt is, of course, beneficial and preferred.

The monomer containing the polymerization inhibiting amount of salt can subsequently be utilized as such for polymerization into useful compositions. For example, the inhibited monomer may be added to copolymerizable materials, with or without the addition of catalyst, and polymerized under known conditions to useful end products such as molding compositions, cast sheets, etc. Similarly, the diallyl diglycol carbonate can be homopolymerized into useful articles such as lenses etc. by the application of heat and/or catalyst addition.

The following examples are set forth for purposes of illustration only and are not to be construed as limitations on the present invention except as set forth in the appended claims. All parts and percentages are by weight unless otherwise specified.

Example 1

To suitable vessels containing methyl methacrylate monomer or diallyl diglycol carbonate are added the concentrations of salts shown below in Table I. The resultant mixtures are allowed to stand at room temperature and are inspected regularly for gelling, i.e. polymerization. The time required for gelling is recorded for each sample.

TABLE I

| Example No. | Monomer | Inhibitor Formula No. | R | X | P.p.m. | Time before gelling, weeks |
|---|---|---|---|---|---|---|
| 1 | MMA[1] | I | $CH_3$ | $SbF_6^-$ | 1 | 8 |
| 2 | MMA[1] | I | $CH_3$ | $SbF_6^-$ | 10 | 14 |
| 3 | MMA[1] | I | $CH_3$ | $SbF_6^-$ | 100 | 2 [2] 14 |
| 4 | MMA[1] | II | $C_2H_5$ | $SbF_6^-$ | 1 | 12 |
| 5 | MMA[1] | II | $C_2H_5$ | $SbF_6^-$ | 10 | 13 |
| 6 | MMA[1] | II | $C_2H_5$ | $SbF_6^-$ | 100 | 2 [2] 14 |
| 7 | MMA[1] | III | $C_4H_9$ | $SbF_6^-$ | 1 | 8 |
| 8 | MMA[1] | III | $C_4H_9$ | $SbF_6^-$ | 10 | 2 [2] 7 |
| 9 | MMA[1] | III | $C_4H_9$ | $SbF_6^-$ | 100 | 2 [2] 14 |
| 10 (Control) | MMA[1] | | | | | 5 |
| 11 | DDC[3] | I | $CH_3$ | $SbF_6^-$ | 1 | 8 |
| 12 | DDC[3] | II | $C_2H_5$ | $SbF_6^-$ | 1 | 12 |
| 13 | DDC[3] | III | $C_4H_9$ | $SbF_6^-$ | 1 | 8 |
| 14 (Control) | DDC[3] | | | | | 5 |

[1] Methyl methacrylate.
[2] Months.
[3] Diallyl diglycol carbonate.

Examples 15–17

When methyl methacrylate monomer is replaced by t-butyl methacrylate monomer in Examples 1, 5 and 9, results similar to those of said examples i.e. polymerization inhibition of the monomer for 10 weeks, 16 weeks and 15 months, is observed. Gelation of the monomer alone usually occurs in 7–9 weeks.

Examples 18–20

Replacement of the methyl methacrylate of Examples 2, 6 and 8 by lauryl methacrylate monomer inhibits the polymerization thereof for 16 weeks, 18 months and 10 months, respectively. Without addition of the inhibitor, gelling occurs in 11 weeks.

Examples 21–23

Following the procedure of Examples 3, 4 and 7 except that the methyl methacrylate is replaced by stearyl methacrylate monomer, inhibition of gelation thereof is effected for 20 months, 16 weeks and 13 weeks, respectively. The monomer generally gels at room temperature in about 10–12 weeks.

Example 24

The procedure of Example 11 is again followed except that the inihibtor thereof is replaced by 10 parts per million of tris(p-diethylaminophenyl)aminium hexafluoroantimoniate, i.e. R is ethyl and X is $SbF_6^-$. No gelation of monomer is observed until about 15 weeks thereafter.

Example 25

The procedure of Example 1 is again followed except that tris(p-dibutylaminophenyl)aminium hexafluoroantimoniate (i.e. $R=C_4H_9$ and $X=SbF_6^-$) is used as the inhibitor at a concentration of 150 parts per million of monomer. 20 months elapse before gelation is observed.

Example 26

Replacement of the inhibitor of Example 4 with bis(p-dibutylaminophenyl)[N,N - bis - p - dibutylaminophenyl] aminium hexafluoroantimoniate ($R=C_4H_9$; $X=SbF_6^-$) inhibits gelation of the monomer for 11 weeks.

Example 27

Examle 7 is again followed except that the inhibitor thereof is replaced by N,N,N′,N′-tetrakis(p-diethylaminophenyl - p - benzoquinonebis(imonium hexafluoroantimoniate) i.e. ($R=C_2H_5$; $X=SbF_6^-$). Gelation of the monomer is inhibited for 7 weeks.

Example 28

Reduction of the concentration of the inhibitor of Example 12 to 0.1 part per million of catalyst inhibits the gelation time to 7 weeks after addition thereof.

Example 29

Replacement of the hexafluoroantimoniate of Example 1 with the corresponding hexafluoroarsenate inhibits gelation of the monomer until 7 weeks after the addition thereof.

Examples 30–34

When the hexafluoroantimoniates of Examples 2, 6, 9, 13 and 27 are replaced with the corresponding perchlorate, trichloroacetate, benzenesulfonate, fluoroborate and nitrate, respectively, the gelation of the monomer to which the compound is added is inhibited for 12 weeks, 11 months, 10 months, 10 weeks and 8 weeks, respectively.

Example 35

Replacement of the inhibitor of Example 1 with 1000 parts per million of the corresponding amyl derivative inhibits the gelation of the methyl methacrylate for 18 months.

I claim:

1. A composition of matter consisting essentially of (A) a normally liquid methacrylate monomer or solution thereof and (B) a polymerization inhibiting amount of a salt having the formula

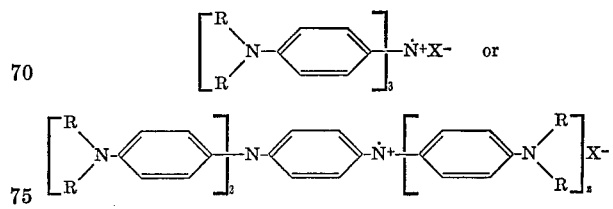

or

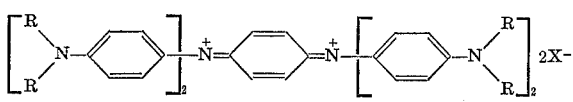

wherein each R is a lower alkyl group and X is an anion.

2. A composition of matter according to claim 1 containing in addition to (A) and (B), (C) a polymerization catalyst.

3. A method for inhibiting the polymerization of a normally liquid methacrylate monomer or solution thereof which comprises incorporating therein a polymerization inhibiting amount of a salt having a formula set forth in claim 1.

4. A composition according to claim 1 wherein said (A) is methyl methacrylate.

5. A method according to claim 3 wherein said methacrylate is methyl methacrylate.

6. A composition according to claim 1 wherein said salt is bis(p - diethylaminophenyl)[N,N - bis(p-diethylantimoniate or tris(p-dibutylaminophenyl)aminium hexafluoroantimoniate or tris(p-diethylaminophenyl)aminum hexafluorantimoniate.

7. A composition according to claim 1 wherein said salt is bis(p - diethylaminophenyl)[N,N - bis(p-diethylaminophenyl) - p-aminophenyl]aminium hexafluoroantimoniate or bis(p - dibutylaminophenyl)[N,N - bis(p-dibutylaminophenyl) - p-aminophenyl]aminium hexafluoroantimoniate.

8. A composition according to claim 1 wherein said salt is N,N,N',N' - tetrakis(p - dibutylaminophenyl)-p-benzoquinone-bis(imonium hexafluoroantimoniate) or N,N,N',N', - tetrakis(p - diethylaminophenyl)-p-benzoquinonebis(imonium hexafluoroantimoniate).

References Cited

UNITED STATES PATENTS 2,681,918   6/1954   Pedersen _____ 260—486 R
2,863,851   12/1958  O'Brien _____ 260—486 R HENRY R. JILES, Primary Examiner
P. J. KILLOS, Assistant Examiner U.S. Cl. X.R.
260—463